United States Patent
Cranford, Jr. et al.

(10) Patent No.: US 7,286,620 B2
(45) Date of Patent: Oct. 23, 2007

(54) EQUALIZER FOR REDUCED INTERSYMBOL INTERFERENCE VIA PARTIAL CLOCK SWITCHING

(75) Inventors: Hayden C. Cranford, Jr., Cary, NC (US); Westerfield J. Ficken, Cary, NC (US); Wentai Liu, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 10/665,235

(22) Filed: Sep. 17, 2003

(65) Prior Publication Data

US 2005/0058231 A1    Mar. 17, 2005

(51) Int. Cl.
*H04L 1/00* (2006.01)
(52) U.S. Cl. ............... 375/348; 375/229; 375/376
(58) Field of Classification Search ........ 375/348, 375/234, 376, 229; 327/149, 158
See application file for complete search history.

(56) References Cited

U.S. PATENT DOCUMENTS

| 4,186,384 | A |  | 1/1980 | Acker | 340/347 |
|---|---|---|---|---|---|
| 5,291,519 | A |  | 3/1994 | Tsurumaru | 375/12 |
| 5,481,564 | A |  | 1/1996 | Kakuishi et al. | 375/230 |
| 5,602,583 | A |  | 2/1997 | Citta | 348/21 |
| 5,822,368 | A |  | 10/1998 | Wang | 375/229 |
| 6,026,121 | A |  | 2/2000 | Sadjadpour | 375/262 |
| 6,088,398 | A |  | 7/2000 | Wahlqvist et al. | 375/260 |
| 2004/0096025 | A1 | * | 5/2004 | Rupp | 375/376 |

* cited by examiner

*Primary Examiner*—Temesghen Ghebretinsae
(74) *Attorney, Agent, or Firm*—Sawyer Law Group LLP

(57) ABSTRACT

A method and system for is disclosed for reducing intersymbol interference in a stream of data bits to be transmitted over a transmission medium. Aspects of the present invention include a phase delayed clock generated from a reference clock that produces an edge on sub-bit boundaries; and a digital filter coupled to the phase delayed clock for performing equalization on the data bits, wherein the phase delayed clock causes the digital filter to perform partial clock switching, such that equalization is performed on the data bits on-sub-bit boundaries.

18 Claims, 5 Drawing Sheets

Prior Art
Scheme 1: No Equalization

Prior Art
Scheme 2: Bit Equalization

Scheme 3: Partial Bit Equalization

EQUALIZER FOR REDUCED INTERSYMBOL INTERFERENCE VIA PARTIAL CLOCK SWITCHING

FIELD OF THE INVENTION

The present invention relates to method for reducing intersymbol interference in high-speed serial communication systems, and more particularly to a method and system for performing equalization on a signal using partial clock switching.

BACKGROUND OF THE INVENTION

In digital, high-speed serial communication systems, binary signals are transmitted between a transmitter and a receiver as a series of square pulses, which are used as basic communication symbols. Characteristics of the transmission channel, such as the type of metal used and the type of connectors, distort the signals. One type of distortion, referred to as intersymbol interference, occurs when the transmission medium propagates the frequency components of the data (symbols) at different rates, causing the symbols to overlap from one bit interval to another.

FIG. 1 is a diagram showing a signal transmitted over a channel having bit intervals of time "T". A single pulse transmitted at time 0 is passed through the channel. As shown, intersymbol interference caused by the channel results in a significant spillover of the bit-interval's energy into the succeeding bit that was transmitted between time T and 2T. One well-known method for reducing such intersymbol interference is through the use of an equalizer. The type of equalizer being used herein is basically a filter having an approximate inverse transfer function to that of the channel (transmission medium) that is used to correct amplitude and delay distortion. This is accomplished by de-emphasizing energy in the proper frequency band. Through the use of this equalizer, the transfer function associated with frequencies within the passband can be made relatively flat, which reduces the potential for one symbol to interfere with another in the time domain.

One type of equalizer includes current-mode differential drive circuits that are controlled by a finite impulse response (FIR) filter. In its general form, the filter comprises a combination of a shift register containing the current outgoing data bit, and a history of the three previous data bits. After a drive circuit outputs a signal corresponding to the first bit, the signals for the subsequent bits are altered on each bit boundary to compensate for the characteristics of the transmission medium, such as a serial link. Typically, the signal for each bit is altered by reducing its amplitude to address the distortion.

Although performing equalization with an FIR that uses bit boundary switching reduces intersymbol interference, one disadvantage is that altering the signals only at the beginning of each bit interval can slow the response of the filter and fails to maximize channel response. Accordingly, a new and improved equalization scheme is desired. The present invention addresses this need.

SUMMARY OF THE INVENTION

The present invention provides a method and system for reducing intersymbol interference in a stream of data bits to be transmitted over a transmission medium. Aspects of the present invention include a phase delayed clock generated from a reference clock that produces an edge on sub-bit boundaries; and a digital filter coupled to the phase delayed clock for performing equalization on the data bits, wherein the phase delayed clock causes the digital filter to perform partial clock switching, such that equalization is performed on the bits on sub-bit boundaries.

According to the method and system disclosed herein, the present invention utilizes a variable delay technique to change the equalizer output on non-bit-time intervals for intersymbol interference reduction without requiring a faster clock.

DETAILED DESCRIPTION OF THE INVENTION

The present invention relates to methods for reducing intersymbol interference. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiment shown, but is to be accorded the widest scope consistent with the principles and features described herein.

The present invention provides a method and system for performing partial bit equalization, where equalization for a particular bit is performed in advance of the bit boundary for that bit, rather than equalization changes occurring exactly at bit boundaries. The present invention introduces equalization changes at some partial time during transmission of the previous bit and therefore on non-bit boundaries.

Figure 1:
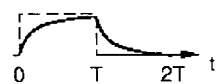
FIG. 1 is a diagram showing a signal transmitted over a channel having bit intervals of time "T".
Figure 2:
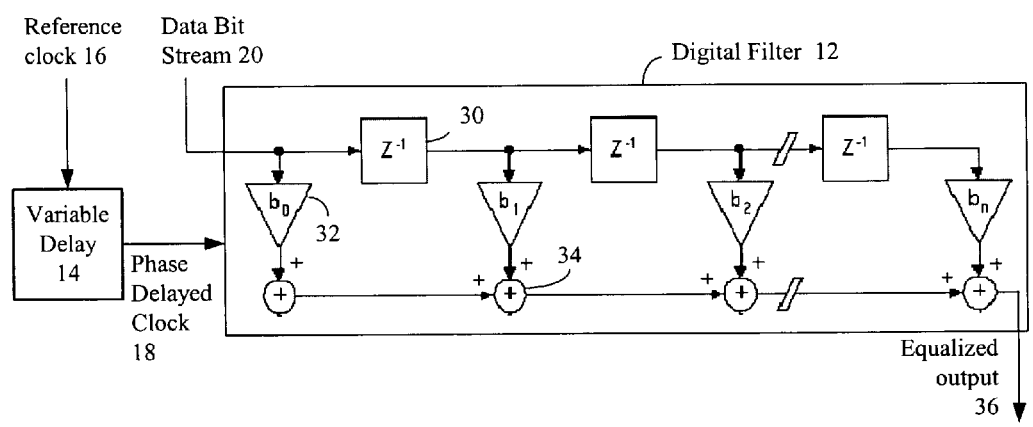
FIG. 2 is a block diagram illustrating a partial bit equalization system in accordance with one preferred embodiment of the present invention.

FIG. 2 is a block diagram illustrating a partial bit equalization system in accordance with one preferred embodiment of the present invention. The equalization system 10 includes a general-purpose digital filter 12, and a variable delay circuit 14 for controlling the timing of the digital filter 12. A data stream 20 of bits is input to the digital filter. In a preferred embodiment, the data stream 20 is in Non-Return-to-Zero (NRZ) format, which is a common data transmission method in which 0s and 1s are represented by different polarities, typically positive for 0 and negative for 1.

According to the present invention, the variable delay circuit 14 inputs a reference clock 16 and then delays the clock 16 to produce a phase delayed clock 18. The phase delayed clock 18 and a data stream of bits 20 are input into the digital filter 12. The phase delayed clock 18 produces an edge on sub-bit boundaries, which in turn, causes the digital filter 12 to perform partial clock switching, such that equalization is performed on the bits on sub-bit boundaries.

As shown, in a preferred environment, the filter 12 preferably includes a standard finite impulse response (FIR) filter. The FIR filter includes plurality of Z-domain delay blocks 30, gain stages 32, and summing junctions 34. The data stream 20 comprises a discrete time signal series of data samples or bits, each having a sample period of time duration T. Each time the filter 12 samples an input bit, the previous inputs are shifted down the chain of $Z^{-1}$ blocks 30 so that the filter 12 retains a "history" of past input values. Thus, the past input values are delayed by a number of intervals of time duration of T that is equal to the number of delay blocks 30 through which it has been passed. Each delayed past input value output by the delay blocks 30 and the present input value is multiplied by a fixed coefficient "b". These terms are then summed via the summing junctions 34 to create an equalizer output signal 36.

In implementation, the current outgoing bit and the three previous bits are typically stored in a shift register. This shift register, in turn, controls activation of the gain stages 32, which are weighted current drivers. The output transfer function of signal 36 is of the general form:

$$H(Z) = b_0 + b_1 Z^{-1} + b_2 Z^{-2} + b_3 Z^{-3}$$

where coefficients are negative. The numerical values of the coefficients are set by register values in the logic. The determining factors for the values of these coefficients include the characteristics of the transmission media, the speed of transmission, the type of board connector used, the type of chip package, and so on. It should be noted that the data bits 20 are fed to a transmitter after the necessary conversion to the differential signal form and the "powering up" required to control the driver itself.

The filter 12 can be described as a technique to reduce some of the intersymbol interference produced by a transmission medium. It is necessary to equalize the transmitted data stream as a means to reduce the amount of intersymbol interference created by copper skin effect and circuit card dissipation factor; the former related to the root of the operating frequency, the latter related in a linear manner to the operating frequency.

A conventional digital filter, however, only functions during discrete time increments of duration T, and therefore only makes equalization changes at the start of each sample period, which coincides with each bit-boundary. Applicants have recognized that equalization of the output signal can be improved if the equalization changes occur prior to the start of each bit sample period. This is referred to herein as partial bit equalization.

One method for implementing partial bit equalization is to run the standard reference clock at a higher rate and then sample it down to produce a clock with different phase positions. In high-speed serial environments, however, running the reference clock at multi-gigahertz frequencies is not practical. Therefore, according to a further aspect of the present invention, the variable delay 14 shown in FIG. 2 for producing an accurate and variable delay of the reference clock 16 is implemented as a partial clock switching circuit, as described below.

Figure 3:
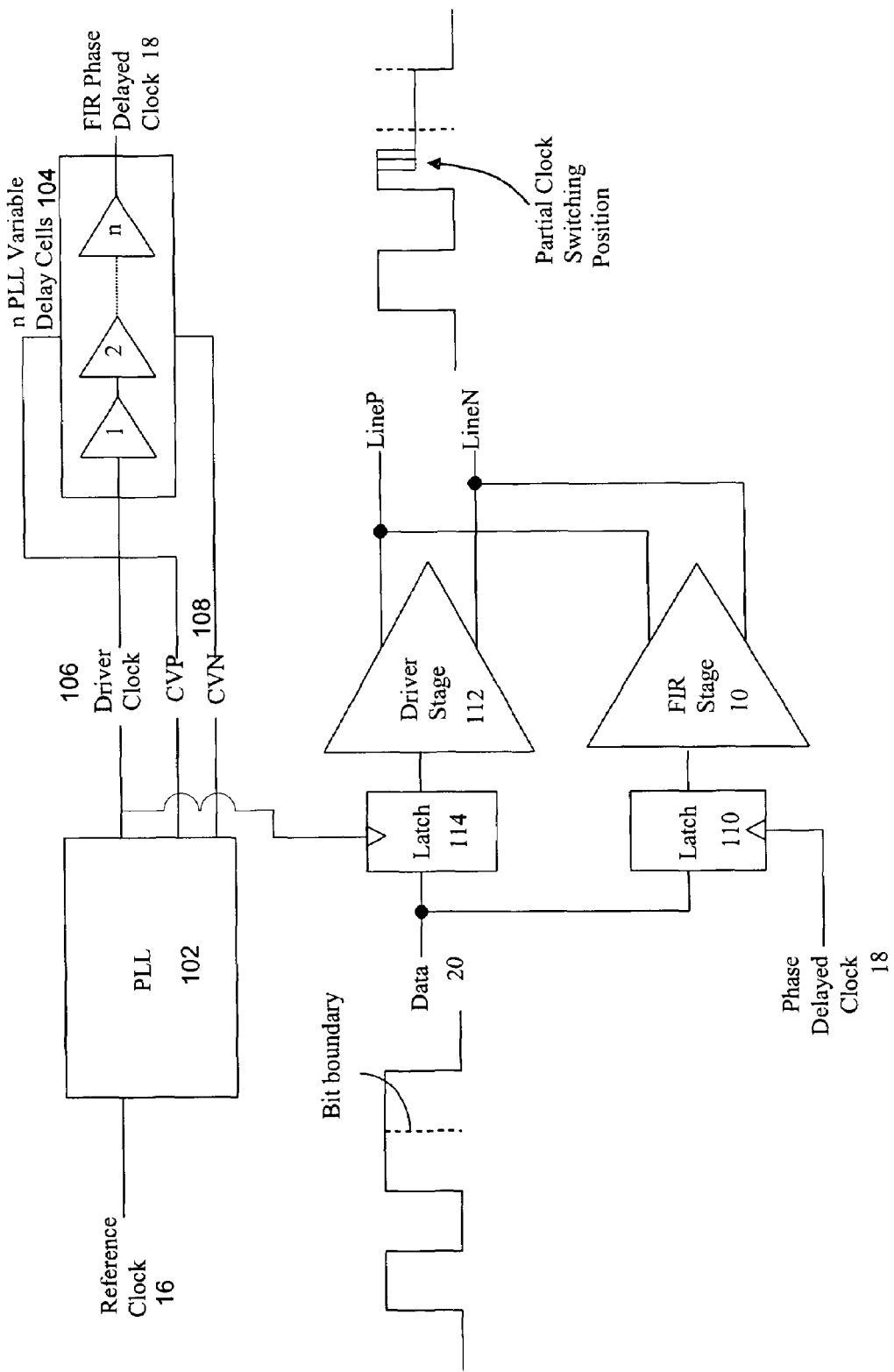
FIG. 3 is a diagram showing a preferred embodiment of the partial clock switching circuit, where like components have like reference numerals.

FIG. 3 is a diagram showing a preferred embodiment of the partial clock switching circuit, where like components have like reference numerals. In a preferred embodiment, the partial clock switching circuit 100 for controlling partial bit equalization includes a phased locked loop (PLL) 102 coupled to a set of n PLL variable delay cells 104. The reference clock 16 is input to the PLL 102. A driver clock 106 and a control voltage 108, which comprises control voltage P (CVP) and control voltage N (CVN), are output from the PLL 102 and input to the set of variable delay cells 104 to generate the phase delayed clock 18.

In operation, the PLL 102 receives the reference clock 16 and frequency synthesizes it to step the reference clock 16 up to the frequency of the driver stage 112. As is well-known in the art, the control voltage 108 is used in most PLL's to control a variable oscillator (not shown) within the PLL. According to the present invention, the control voltage 108 is used to the delay cells 114, which are the same type used in the PLL 102. For example, assuming that the PLL 102 included six segments, and two delay cells 114 are used, then the resulting phase delayed clock 118 would be running at the same frequency as PLL 102 but would be phase delayed from PLL 102 by one-third of a cycle. Thus, the phase delayed clock 18 (with variable delay) has a precisely settable delay based on the number of delay cells 104 used. This makes the partial bit time switching required for partial bit time equalization feasible. Any delay within a bit sample period is possible, e.g., ¾, ½, ⅓, ¼ of time duration T. In this implementation, the partial bit time equalization is performed without the need for higher rate clocks.

The driver clock 106 and the data stream 20 are input to a driver stage 112 through latch 114. An example series of bits for the data 20 is also shown in FIG. 3. The bit boundary between two consecutive high bits is shown by a dashed line. The latch 114 clocks the asynchronous data stream 20 in; and the analog driver stage 112 inputs the latched data and outputs it at some differential level on lineP and lineN.

The phase delayed clock 18 and the data stream 20 are input to the FIR stage through latch 110, which operates similar to latch 114. The phase delayed clock 18 is delayed by an amount controlled by the delay cells 114 and is input to latch 110 at some intermediate point after the driver clock 106 is input to latch 114. The FIR stage 10 performs equalization on the input data 20 based on the phase delayed clock 18, where the delay of the clock 18 determines where equalization changes are performed on the data. The example series of data bits 20 is also shown in FIG. 3 being output on lineP and lineN. As shown, equalization for the second bit in the series of two consecutive bits is performed prior to the bit boundary between the two bits. The same amount of equalization is applied to the bits in amplitude, but the equalization is applied at some variable point during the previous bit depending on how many delay cells 114 are used or what phase positions is chosen.

Using a variable delay, the current/voltage output change for the FIR filter 12 is activated in advance of the current bit boundary when the bit history indicates the run length requires equalization. Introducing changes to an output sample prior to the occurrence of the bit boundary results in faster response, enabling the signal to settle sooner and reducing the potential for interference with the next bit time. Implementing signal changes for each bit at a time partially through the previous bit effectively changes the coefficient of the equation. For example, each the $Z^{-1}$ block 30 shown FIG. 2 may not delay the signal an entire bit, but would change at some point during the previous bit. By judicious selection of the coefficients (and placement of the partial clock position) one may control both the attenuation of the lower frequencies (providing better equalization) and the enhancement of the higher harmonics.

In an alternative embodiment, digital-to-analog (D/A) converter could be used to set the control voltages, rather than the master slave approach described above. The D/A could sample the entire system with a feedback loop and adjust the control voltages to provide the different delay positions.

In both embodiments, the variable delay activation of the delayed clock 18, which is delayed from the start of the bit time, is used to set the point in time where equalization reduces the amplitude of the output bit in order to reduce the energy contained at low frequencies to a time within the bit time of the previous bit. This gives better performance from several standpoints when compared to the amplitude reduction at the bit boundary, as done in conventional equalization. A significant advantage is that this causes the impulse response to settle sooner (helping to control intersymbol interference) as well as preserving more of the high frequencies as depicted in the frequency response.

Figure 4:
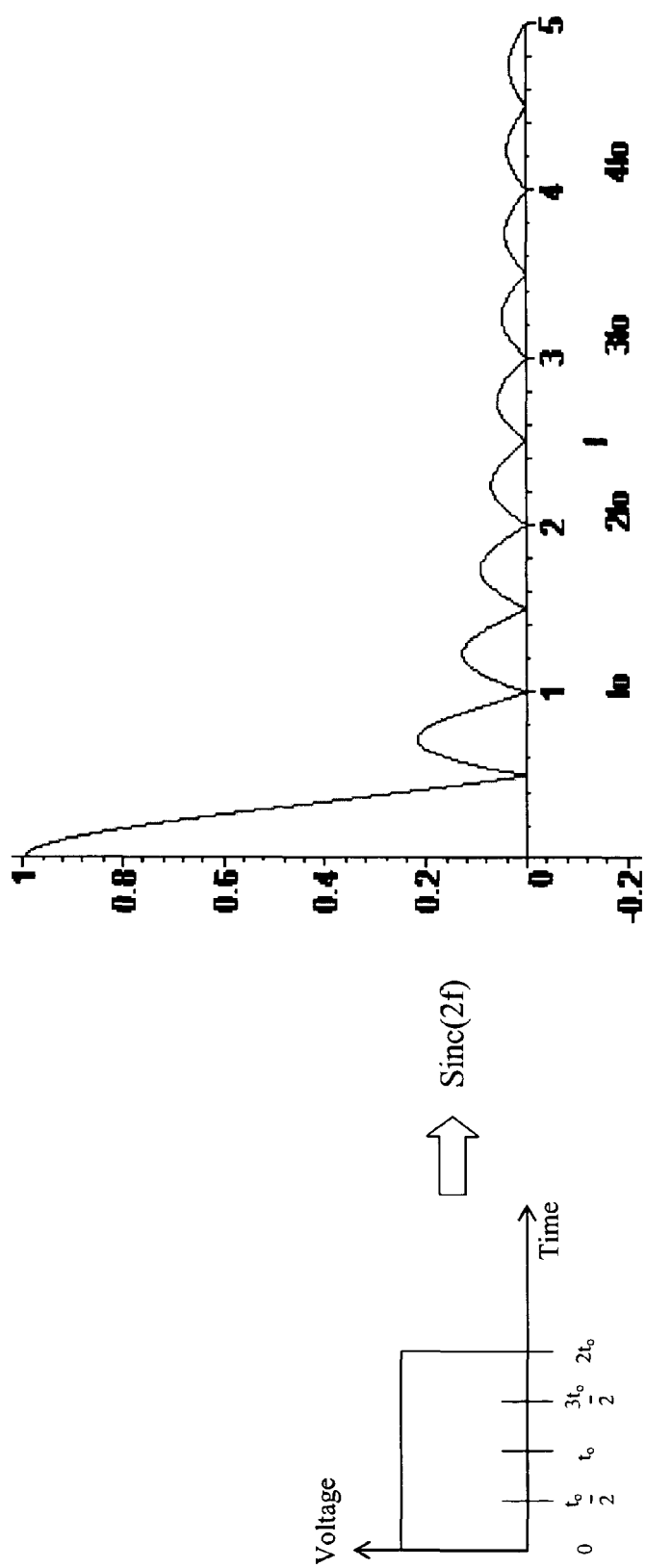
FIGS. 4-6 are diagrams illustrating three schemes for transmitting an example pulse of width $2t_0$ and a corresponding graph of the frequency response of the signal.
Figure 5:
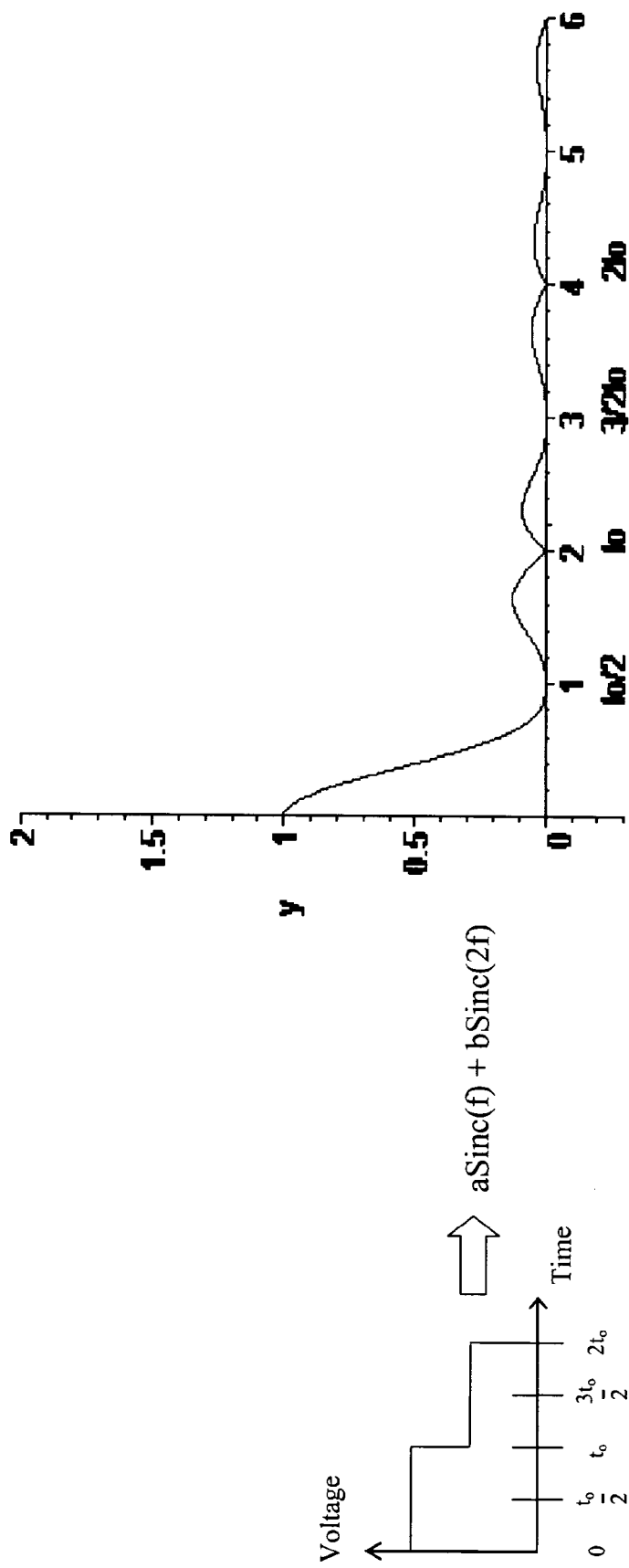
Figure 6:
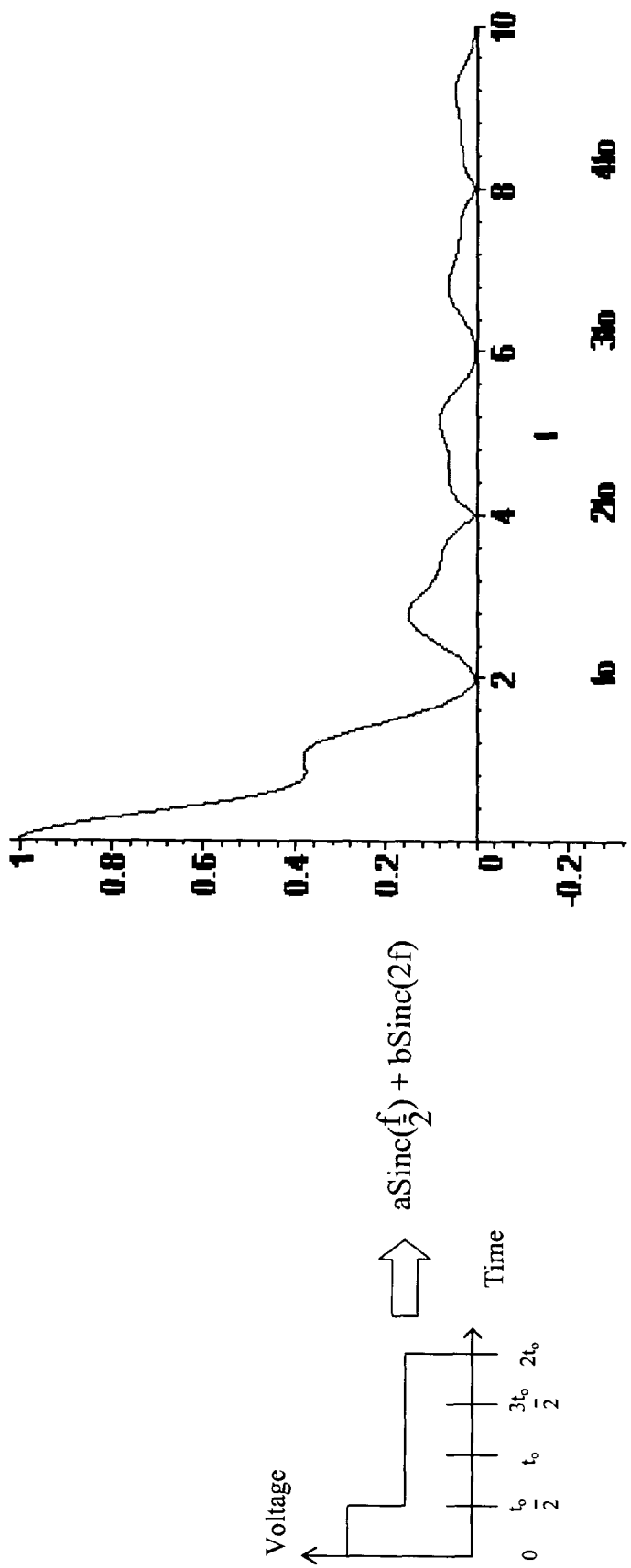

FIGS. 4-6 are diagrams illustrating three schemes for transmitting an example pulse of width $2t_0$ and a corresponding graph of the frequency response of the signal. FIG. 4 shows a conventional scheme in which no equalization is applied to the pulse. In this case the frequency response is $Sinc(2f)$, which leaves a fair amount of low-frequency content in the signal.

FIG. 5 shows a conventional scheme in which bit equalization is applied to pulse so that equalization occurs at $t_0$. This results in a frequency response for the signal of $aSinc(f)+bSinc(2f)$, which suppresses some low frequencies as desired.

FIG. 6 shows a partial bit equalization scheme in accordance with the present invention in which bit equalization is performed at $t_o/2$, rather than $t_o$, which more effectively suppresses low frequencies and accentuate the higher order frequency band than the schemes shown in FIGS. 4 and 5. The frequency response for the resulting signal is $aSinc(f/2)+bSinc(2f)$.

A method and system for performing equalization on a signal using partial clock switching has been disclosed in which a variable delay technique is used to change equalizer output on non-bit-time intervals for intersymbol interference reduction without requiring a faster clock. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for reducing intersymbol interference in a stream of data bits to be transmitted over a transmission medium, comprising:
    (a) delaying a reference clock to produce a phase delayed clock that produces an edge on sub-bit boundaries; and
    (b) inputting the phase delayed clock and the data bits into the digital filter in order to perform equalization on the data bits, wherein the phase delayed clock causes the digital filter to perform partial clock switching, such that equalization is performed on the data bits on sub-bit boundaries.

2. The method of claim 1 wherein the digital filter produces an equalized output signal having a frequency response of $aSinc(f/2)+bSinc(2f)$.

3. The method of claim 2 further including the step of: inputting a driver clock to the digital filter along with the phase delayed clock, wherein the phase delayed clock appears at an output at a predetermined intermediate time of the driver clock.

4. The method of claim 3 wherein each of the data bits has a sample period of time duration T, and the delay of the phase delayed clock may be set at any portion of the time duration T, including ¾, ½, ⅓, and ¼ of the time duration T.

5. The method of claim 4 further including the step of: delaying the reference clock using a partial clock switching circuit.

6. The method of claim 5 wherein the partial clock switching circuit comprises a phased locked loop (PLL) coupled to a set of n PLL variable delay cells, wherein the number of delay cells controls an amount of delay of the input reference clock.

7. The method of claim 6 wherein the digital filter includes a finite impulse response (FIR) filter.

8. The method of claim 7 wherein the FIR filter includes a plurality of Z-domain delay blocks, gain stages, and summing junctions.

9. The method of claim 8 wherein the transmission medium comprises a serial link.

10. A system for reducing intersymbol interference in a stream of data bits to be transmitted over a transmission medium, comprising:
    (a) a phase delayed clock generated from a reference clock that produces an edge on sub-bit boundaries; and
    (b) a digital filter coupled to the phase delayed clock for performing equalization on the data bits, wherein the phase delayed clock causes the digital filter to perform partial clock switching, such that equalization is performed on the data bits on sub-bit boundaries.

11. The system of claim 10 wherein the digital filter produces an equalized output signal having a frequency response of $aSinc(f/2)+bSinc(2f)$.

12. The system of claim 11 wherein a driver clock is input to the digital filter along with the phase delayed clock, wherein the phase delayed clock appears at an output at a predetermined intermediate time of the driver clock.

13. The system of claim 12 wherein each of the data bits has a sample period of time duration T, and the delay of the phase delayed clock may be set at any portion of the time duration T, including ¾, ½, ⅓, and ¼ of the time duration T.

14. The system of claim 13 wherein the reference clock is delayed using a partial clock switching circuit.

15. The system of claim 14 wherein the partial clock switching circuit comprises a phased locked loop (PLL) coupled to a set of n PLL variable delay cells, wherein the number of delay cells controls an amount of delay of the input reference clock.

16. The system of claim 15 wherein the digital filter includes a finite impulse response (FIR) filter.

17. The system of claim 16 wherein the FIR filter includes a plurality of Z-domain delay blocks, gain stages, and summing junctions.

18. The system of claim 17 wherein the transmission medium comprises a serial link.

* * * * *